United States Patent [19]

Moriwaki et al.

[11] 4,370,163

[45] Jan. 25, 1983

[54] HYDROGEN STORAGE ALLOY AND PROCESS FOR MAKING SAME

[75] Inventors: Yoshio Moriwaki, Hirakata; Takaharu Gamou, Fujiidera; Nobuyuki Yanagihara, Hirakata; Toshio Yamashita, Katano; Tsutomu Iwaki, Yawata, all of Japan

[73] Assignee: Matsushita Electric Industrial Company, Limited, Osaka, Japan

[21] Appl. No.: 184,173

[22] Filed: Sep. 4, 1980

[30] Foreign Application Priority Data

Sep. 7, 1979 [JP] Japan ................. 54-115507
Sep. 26, 1979 [JP] Japan ................. 54-124616
Feb. 15, 1980 [JP] Japan ................. 55-18103

[51] Int. Cl.³ .............. C22C 14/00; C22C 38/14; C01B 6/24
[52] U.S. Cl. .............. 420/582; 420/417; 420/900; 423/644; 420/583; 420/584; 420/585; 420/586
[58] Field of Search .......... 75/123 M, 134 F, 175.5; 423/644

[56] References Cited

U.S. PATENT DOCUMENTS

| | | | |
|---|---|---|---|
| 3,922,872 | 12/1975 | Reilly et al. | 75/175.5 |
| 4,160,014 | 7/1979 | Gamo et al. | 75/134 F |
| 4,278,466 | 7/1981 | de Pous | 75/134 F |
| 4,283,226 | 8/1981 | van Mal et al. | 423/644 |

FOREIGN PATENT DOCUMENTS 2650276 12/1977 Fed. Rep. of Germany ...... 423/644
51-12461 10/1976 Japan .

*Primary Examiner*—Peter K. Skiff
*Attorney, Agent, or Firm*—Lowe, King, Price & Becker

[57] ABSTRACT

A hydrogen storage Ti-Fe alloy of the general formula, $Ti_{1-x}A_xFe_{y-z}B_z$, in which A is Zr, Hf or a mixture thereof, B is a member selected from Cr, Cu, Co, Mo, V, Ni, Nb, Mn and a mixture thereof, and x, y and z are values of certain ranges, respectively. The alloy is predominantly comprised of an effective alloy phase of CsCl type body-centered cubic crystals. The alloy of the formula where $z=0$ is within the scope of the invention. A process for making an alloy of this type is also disclosed.

9 Claims, 4 Drawing Figures

HYDROGEN STORAGE ALLOY AND PROCESS FOR MAKING SAME

BACKGROUND OF THE INVENTION

1. Field of the Invention

This invention relates to hydrogen storage alloys and more particularly, to improved TiFe alloys useful for hydrogen storage. It also relates to a process for making alloys of this type.

2. Description of the Prior Art

In the storage or transport of hydrogen, it is the general practice to use pressure-resistant containers in which hydrogen is filled in a gaseous state. In a recent trend the hydrogen is stored or transported after having been converted to liquid hydrogen and held at super low temperatures. However, both types require containers of specific types which are undesirably very large in size for gaseous hydrogen and have to be designed abiabatically for the liquid phase. In this sense, these containers are inconvenient for the transport or storage of hydrogen and are not considered satisfactory as hydrogen storing devices as such devices are usually required to be small in size and free of problems concerning safety and transportation.

There is also known a technique for storing hydrogen in which hydrogen is absorbed for storage in certain types of metals or alloys and is released on application. Particular attention has been drawn to this hydrogen storage method since an amount of occluded hydrogen per unit volume of a metal or alloy is large. This occlusion reaction proceeds according to the following solid-gas phase reaction with the attendant generation of heat, $-\Delta H$ (kcal/mole $H_2$):

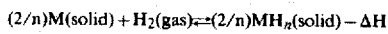

where n is the number of hydrogen atoms in the metal hydride.

Certain types of metals or alloys can hold hydrogen in high density by absorbing it under inherent temperature and pressure conditions in an atmosphere of hydrogen or under electrochemical conditions to form a corresponding metal hydride or hydrides. This occluded hydrogen may be reversibly released by placing the metal or alloy under controlled temperature or pressure conditions or under controlled electrochemical conditions.

This hydrogen storage technique has a number of advantages: the hydrogen can be stored at such a high density as in the case of liquid hydrogen since hydrogen is infiltrated into lattices of metal crystals and chemically combined with the metal to form a metal hydride; since hydrogen can be held in a solid state, it is much safer; this hydrogen occlusion or storage technique can be used in place of existing bottled gas systems or liquid hydrogen systems if storage and withdrawal of hydrogen is feasible at relatively low cost; and occluded hydrogen can be stored over a long period without a loss of hydrogen by evaporation as will be experienced in the case of liquid hydrogen.

A number of hydrogen storage metal materials have been proposed and are known including Mg, alloys such as Mg-Ni, Mg-Cu, R-Ni and R-Co (where R is a rare earth element or a mixture thereof.), Ti-Fe, Ti-Ni and the like.

Of these, Ti-Fe alloys are well known as typical hydrogen storage alloys. The Ti-Fe alloy is an intermetallic compound which has a Ti to Fe atomic ratio of 1:1. This Ti-Fe alloy has several excellent characteristics which make it useful as a hydrogen storage alloy and its practicality is considered to be relatively high. However, it has the following disadvantages. Thus, it is very difficult for the alloy to be hydrogenated or be occluded with hydrogen at an initial stage of hydrogenation; the alloy is required to be degassed under heating conditions prior to the hydrogenation reactions; and the velocity of reaction with hydrogen is very small. For instance, other types of hydrogen storage alloys such as $LaNi_5$, $TiMn_{1.5}$ and the like readily undergo an initial hydrogenation at room temperature, and at a hydrogen pressure of 20–30 atms for several minutes to several hours, thereby causing hydrogen to be occluded therein. In contrast, with the Ti-Fe alloy, the initial hydrogenation does not proceed smoothly unless the alloy has been subjected to a degasifying treatment under heating conditions of about 350° C. or more for several hours at a vacuum of $10^{-3}$ mmHg or less prior to the initial hydrogenation reaction. In addition, even though the hydrogenation starts, the Ti-Fe alloy shows a very slow velocity of reaction with hydrogen and it may take 3–10 weeks before the hydrogenation reaction is completed, thus requiring a much longer time of hydrogeneration than, e.g. several tens times in hydrogenation time as long as with the known $LaNi_5$ or $TiMn_{1.5}$ alloy.

In order to overcome these disadvantages of the Ti-Fe alloy, there have been proposed improved Ti-Fe alloys in which other types of metal components are incorporated therein. These alloys include, for example, $TiFe_{0.7}Mn_{0.2}$, $TiFe_{0.9}Co_{0.1}$, $TiFe_{0.9}Cu_{0.1}$, $Ti_{0.9}Mo_{0.1}$, $TiFe_{0.9}V_{0.1}$ and the like.

These three-component alloy systems are much improved in initial hydrogenation speed and velocity of reaction with hydrogen. However, some of them are disadvantageous because of a lowering of hydrogen storage capacity and some have a drawback that a plateau or an equilibrium hydrogen pressure range of a hydrogen dissociation pressure-hydride composition-isotherm curve obtained upon occlusion or release of hydrogen is much deteriorated. In this sense, these alloy systems are not always satisfactory for use as a hydrogen storage alloy.

SUMMARY OF THE INVENTION

It is an object of the present invention to provide multi-component hydrogen storage alloys which overcome the disadvantages of the known Ti-Fe alloy systems.

It is another object of the present invention to provide multi-component hydrogen storage alloys which are useful for storage and transport of hydrogen.

It is a further object of the invention to provide TiFe-base multi-component alloys which are much improved in velocities of occlusion and release of hydrogen.

It is a still further object of the invention to provide TiFe-base multi-component alloys which are excellent in their hydrogen storing capacity or characteristic and which can readily absorb hydrogen to form corresponding hydrides at room temperature.

It is another object of the invention to provide a process for making multi-component hydrogen storage alloys of the type mentioned above.

According to one aspect of the present invention, there is provided a hydrogen storage alloy of the general formula $$Ti_{1-x}A_xFe_{y-z}B_z$$

wherein A is Zr, Hf or a mixture thereof, B is at least one member selected from the group consisting of Cr, Cu, Co, Mo, V, Ni, Nb, Mn and a mixture thereof, x is a value of from 0.01 to 0.05 when A is Zr and of from 0.01 to 0.1 when A is Hf, y is a value of from 0.92 to 1.08 when A is Zr and of from 0.85 to 1.15 when A is Hf, and Z is zero or a value of from 0.01 to 0.05 when A is Zr and of from 0.01 to 0.1 when A is Hf.

As will be understood from the above, the alloy of the invention may be a three-component system which is substantially composed of Ti, Fe and Zr, Hf or a mixture thereof.

According to another aspect of the invention, there is provided a process for making a hydrogen storage alloy of the formula, $Ti_{1-x}A_xFe_{y-z}B_z$ wherein A, B, x, y and z have the same meanings as defined above, the process comprising the steps of providing starting metal materials in predetermined mixing ratios, heating the mixture in vacuo at temperatures sufficient to melt the mixture, and quickly cooling the melt at a cooling rate of at least 200° C./min. until the melt is cooled down to 500° C.

The heating temperature varies depending the starting metals used.

By the quick cooling, the alloy is thermally distorted to a degree sufficient to improve the hydrogenating conditions of the alloy and enhances the velocity of reaction with hydrogen. In a preferred aspect, the cooling rate is in the range of above 300° C./min.

The quick cooling may be applied to a metal mixture which has been once melted and then solidified without being quickly cooled. In this case, the solidified metal alloy is again heated to a temperature near its melting point in the range of, for example, 900° to 1300° C. and then quickly cooled at a cooling rate of at least 200° C./min until the heated alloy is cooled down to 500° C., by which the initial hydrogenation reaction is feasible and more easily as compared with the Ti-Fe alloy which has to be degasified, prior to the hydrogenation reaction, under heating conditions of above 300°-350° C. at a reduced pressure of $10^{-3}$ mmHg or less and for a time of several hours.

PREFERRED EMBODIMENTS OF THE INVENTION

Figure 1:
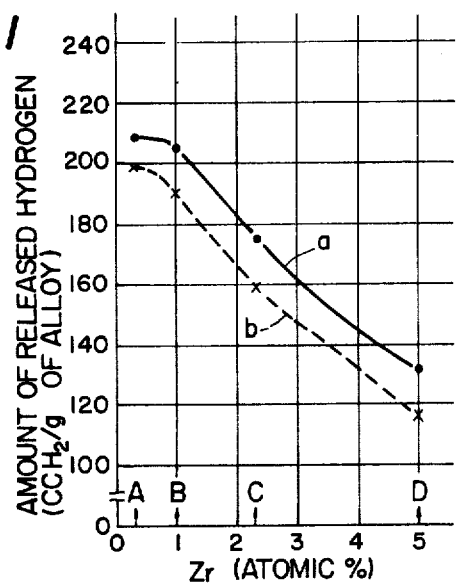
FIG. 1 is a graphical representation of an amount of hydrogen released from a Zr-containing TiFe alloy of the invention in relation to a variation in content of Zr in the alloy for different cooling rates.

During a series of studies of Ti-Fe-base hydrogen storage alloys, we have found that alloys of the formula $$Ti_{1-x}A_xFe_{y-z}B_z$$

in which A represents Zr, Hf or a mixture thereof, X is a value of from 0.01 to 0.05 when A is Zr and of from 0.01 to 0.10 when A is Hf, y is a value of from 0.92 to 1.08 when A is Zr and of from 0.85 to 1.15 when A is Hf, B is at least one member selected from the group consisting of Cr, Cu, Co, Mo, V, Ni, Nb, Mn and a mixture thereof, and z is 0 or a value of from 0.01 to 0.05 when A is Zr and of from 0.01 to 0.10 when A is Hf, can be readily hydrogenated after having been pretreated under milder conditions and are able to absorb hydrogenation at room temperature in larger amounts as compared with known Ti-Fe-base alloys.

The alloys of the invention are characterized in that their effective phase is predominantly comprised of body-centered cubic crystals of the CsCl type and that part of Ti or parts of both Ti and Fe are replaced by the specified metal components, respectively. It will be noted that in known Ti-Fe-base alloys, part of Fe alone is replaced by a metal component such as Cu, Co, Mn or the like.

The alloys of the formula where z=0 will be first described.

Where z=0, the alloys are simply expressed by the formula, $$Ti_{1-x}A_xFe_y$$

in which A, x and y have the same meanings as defined above, respectively.

As indicated above, when A is Zr, x is a value in the range of 0.01 to 0.05 and y is a value of from 0.92 to 1.08, lower amounts of Zr are disadvantageous in that the resulting alloys have to be pretreated under severe conditions prior to the hydrogenation reaction and even though pretreated under such conditions, their velocity of reaction with hydrogen is still slow. On the contrary, larger amounts are also disadvantageous in that the hydrogen storage capacity or characteristic is lowered since incorporation of Zr gives an adverse effect on the crystallinity of the Ti-Fe alloy and an amount of released hydrogen is lowered to a level of below 120 cc/g of alloy.

As for the value of y, the alloy composition of y=1, i.e. Ti:Fe=1:1, is preferable in view of a crystalline form of the alloy and it has been experimentally confirmed that the alloy composition of the formula where y=0.92–1.08 has an effective body-centered cubic phase at a level as high as 90% or more of the alloy and is thus usable in the practice of the invention.

Similarly, when A is Hf, x is a value of from 0.01 to 0.10, preferably 0.01 to 0.05 and y is a value of from 0.85 to 1.15, preferably 0.95 to 1.05. When the value of x increases, the amount of released hydrogen simply decreases. When y is in the range of 0.85 to 0.15 and x>1, the amount of released hydrogen is below 120 cc/g of alloy and thus such alloy is undesirable as a practical matter as a hydrogen storage alloy.

In contrast, the initial hydrogenation reaction proceeds more easily as x increases. In view of the above facts, x is determined in the range of 0.01 to 0.10. It has been found that when x is in the range of 0.01 to 0.05 or y is in the range of 0.95 to 1.05, the amount of released hydrogen is as great as above 140 cc/g of alloy.

When A is a mixture of Zr, and Hf, y is determined in proportion to a mixing ratio of Zr and Hf provided that x is in the range of 0.01 to 0.1.

As will be understood from the above, the effective alloy composition of the invention in the $Ti_{1-x}A_xFe_y$ system has a value of x in the range of 0.01 to 0.05 and a value of y is in the range of 0.92 to 1.08 when A is Zr and the value of x ranges from 0.01 to 0.10 and y ranges 0.85 to 1.15 when A is Hf. The term "effective alloy composition" used herein and whenever it appears hereinafter is intended to mean an alloy which has excellent characteristics, e.g. an amount of released hydrogen of above 120 cc/g of alloy and a time required for an initial hydrogenation of below 200 hours without being subjected to a degasifying pretreatment under heating conditions or by merely pretreating it at room temperature under a vaccum.

The alloys of the formula where Z is in the range of 0.01 to 0.05 when A is Zr, and in the range of from 0.01 to 0.10 when A is Hf will now be described. In either case where A is Zr or Hf, larger amounts of z are disadvantageous in that an alloy phase different from the effective body-centered cubic crystal phase is formed or the crystallinity of the Ti-Fe alloy per se is deteriorated. Less amounts than 0.01 are also disadvantageous since the susceptibility to the initial hydrogenation reaction of the resulting alloy and a velocity of reaction with hydrogen are barely improved by the addition of these metal components of z. In these alloys, Ti and Fe are both replaced by metal components. By the replacement, the body-centered cubic crystal phase of the Ti-Fe alloy becomes more stable, ensuring a flat plateau pressure and an excellent hydrogen storability of the alloy.

When the Ti-Fe alloy is incorporated with a third metal component by replacing part of Fe with such component, the alloy has a tendency to be deteriorated in its crystallinity and uniformity. Though smaller in degree, this tendency also appears in the case of Ti-Fe alloys in which part of Ti is replaced by a third metal component.

In the multi-component alloys of the invention, part of Ti is replaced by Zr, Hf or a mixture thereof in an amount defined hereinbefore with respect to the three-component alloy system and part of Fe is replaced by at least one member taken from Cr, Cu, Co, Mo, V, Ni, Nb, Mn and a mixture thereof, by which the alloy phase becomes improved in crystallinity and uniformity. Accordingly, the flatness of the plateau pressure and hydrogen storability of these alloys are more improved than those of three-component systems, ensuring easier an initial hydrogenation reaction and higher reaction velocity.

The element B which is replaced in part by Fe should be Cr, Cu, Co, Mo, V, Ni, Nb, Mn or a mixture thereof due to its easy substitution therewith. Other elements are not suitable.

When values of x and z increase, there is a tendency for the hydrogenation reaction to proceed more readily and the reaction velocity increases. In this connection, however, the crystallinity and uniformity of the alloy are deteriorated as the values of x and z increase showing a tendency for deterioration and flatness of plateau pressure and lowering the hydrogen storability.

In the multi-component system the value of y is the same as defined with respect to the alloys of the previously indicated formula where $z=0$.

The multi-component alloys including the three-component alloys have been described hereinabove. The relationship between the metal components and the characteristic properties of hydrogen storage materials will now be discussed.

The known Ti-Fe base alloys in which part of Fe is replaced by a metal such as Mn, Co, Cu, Mo, V or the like are effective in rendering the pretreating conditions milder and enhancing the velocity of reaction with hydrogen. However, in order to develop these effects to a practical extent, fairly large amounts of the metal are required to be incorporated, so that the body-centered cubic crystals of the Ti-Fe alloy are deformed or the crystallinity of the effective alloy phase is deteriorated, resulting in a lowering in amount of hydrogen to be occluded or released.

In contrast, in the alloys of the invention it is essential to substitute part of Ti with Zr, Hf or a mixture thereof. These elements show good affinity for Ti and can be readily replaced with Ti. Use of the element only in very small amount has been found to ensure milder pretreating conditions and enhance a hydrogenation reaction velocity. As a matter of course, when Zr or Hf is used in large amounts it gives an adverse effect on the crystallinity or formation of the body-centered cubic crystals of the Ti-Fe base alloys themselves. It will be noted here that Zr is more effective than Hf and is sufficient to be used in an amount as small as ½ time of Hf to attain the same level of characteristics.

Further, the alloys in which Ti is partly replaced by Zr, Hf or a mixture thereof and Fe is partly replaced by at least one element selected from Cr, Cu, Co, Mo, V, Ni, Nb, Mn and a mixture thereof have been found to have a high level of hydrogen storability.

In all the types of the alloys according to the invention, when the metals A and B increase in amounts, it is possible to effect the hydrogenation reaction under milder conditions and accelerate the hydrogenation reaction velocity, but excess amounts are undesirable since a ratio of the body-centered cubic crystals to a total alloy phase decreases to an extent (i.e. such ratio is preferred to be above 90% or more of the alloy) and the crystallinity and uniformity of the alloy phase are also deteriorated, resulting in a lowering of the hydrogen storage characteristic. The alloy compositions according to the invention can satisfy the above requirements and show such characteristics that they are able to release 120 cc or more of hydrogen per g of the alloy and the time required before an initial hydrogenation reaction is complete is within 200 hours even when pretreated at room temperature without being degasified under heating conditions. Alloy compositions outside the scope of the invention are not so useful particularly in view of their hydrogen storage characteristic.

The process for making the alloys according to the invention will be described.

According to the process of the invention, starting metal materials are first provided in predetermined mixing ratios and then placed in a suitable container such as an alumina crucible. The mixture is then heated at temperatures sufficient to melt the mixture. The heating is conducted by any of known methods including an arc melting technique, a high frequency technique, and the like. The resulting melt is quickly cooled at a cooling rate of at least 200° C./min until it is cooled down to 500° C. Preferably, the cooling rate is at least 300° C./min. It has been found that better results are obtained with regard to hydrogenation of the resulting alloy when the cooling rate of the melt is greater. This will be particularly described in Examples which appear hereinafter.

Where the melt has been once solidified, an alloy of excellent characteristics may be obtained by heating the solidified alloy to a temperature near its melting point for a sufficient time and cooling it at a cooling rate as indicated above.

The Ti-Fe base alloys are very tenacious and very hard to break, so that it is possible to thermally distort the alloy to a considerable extent by quick cooling. The thermal distortion is convenient for hydrogenation of the alloy.

The thermal distortion of the alloy largely depends on the cooling rate at a high temperature range and a cooling rate in the low temperature range of below 500° C. gives little or no influence on such thermal distortion.

The alloys according to the invention can be hydrogenated as follows. An alloy mass or lump which has been made is mechanically ground to pieces of several millimeters in size and then placed in a hermetically sealable container such as of stainless steel. The container is evacuated at room temperature such as by a vacuum pump, after which hydrogen gas is charged into the container to a level of about 30 atms. The alloy pieces start to readily occlude hydrogen at room temperature.

The present invention is particularly described by way of examples.

EXAMPLE 1

Starting materials, Ti, Zr and Fe, were weighed out to have compositions indicated in Table 1 below, and each composition was placed in an alumina crucible, followed by heating at a temperature of 1400°-1500° C. in vacuo for about 20 minutes by induction heating to melt the mixture. The starting materials used were commercially available ones each of which had a purity of 99.5% or more.

| | Alloy Composition (atomic %) | | |
|---|---|---|---|
| | Ti | Zr | Fe |
| A | 49.7 | 0.3 | 50.0 |
| B | 49.0 | 1.0 | 50.0 |
| C | 47.7 | 2.3 | 50.0 |
| D | 45.0 | 5.0 | 50.0 |

The melt samples were quickly or slowly cooled from the melting temperature to 500° C. by a casting technique using a cooling rate-controlling method. The quick cooling was effected at a rate of 300° C./min in average and the slow cooling was at a rate of 100° C./min.

The four compositions A through D were each subjected to quick and slow cooling treatments to obtain eight alloys.

These alloys were subjected to a test in which an amount of released hydrogen and a time required before the initial occlusion or hydrogenation reaction was complete were measured.

Figure 2:
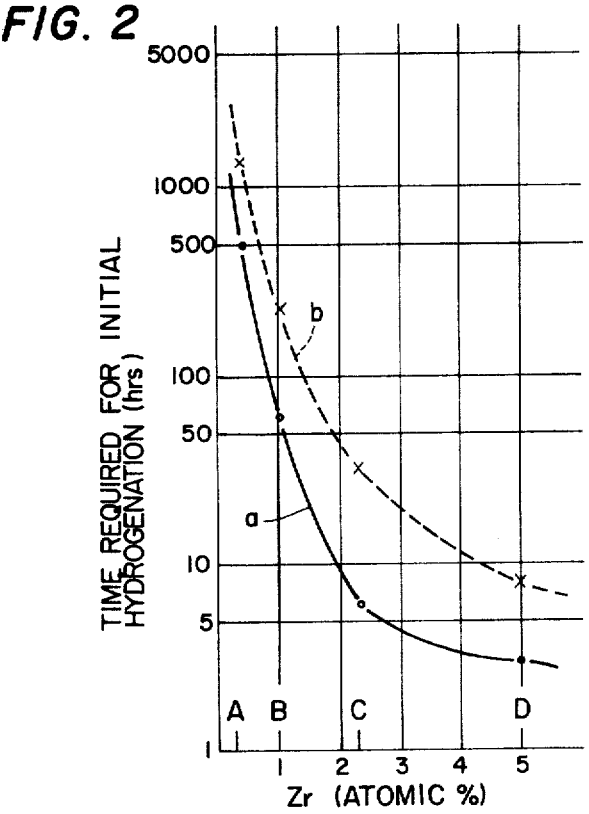
FIG. 2 is a graphical representation of a time required before an initial hydrogenation of a Zr-containing TiFe alloy of the invention is complete in relation to the variation in content of Zr in the alloy for different cooling rates.

The results are shown in FIGS. 1 and 2, in which the abscissa indicates an amount of (by atomic percent) and a solid line a of each figure is for the alloys obtained by the quick cooling and a phantom line b is for the alloys obtained by the slow cooling.

From the figures it will be understood that the alloys treated under quick cooling conditions are superior in the both characteristics to those treated under slow cooling.

EXAMPLE 2

Example 1 was repeated using starting metal materials having predetermined mixing ratios to give alloys of such compositions indicated in Table 2 below. These alloys were measured to determine an amount of occluded hydrogen, an amount of released hydrogen and a time required before an initial hydrogenation or occlusion reaction is complete. Ti-Fe alloy used as a control was subjected to a degasifying treatment at 350° C. for 2 hours prior to hydrogenation. The alloys according to the invention were each subjected to a degasifying treatment at room temperature under a vacuum of about $10^{-2}$ mmHg for 1 hour without heating. The measuring test was conducted at 20° C.

The results are shown in Table 2 below.

| Alloy Composition | Amount of Occluded Hydrogen (ccH$_2$/g alloy) | Amount of released Hydrogen (ccH$_2$/g alloy) | Time required before initial hydrogenation is complete* (hrs) |
|---|---|---|---|
| TiFe (control) | 213 | 201 | 225.0 |
| Ti$_{0.98}$Zr$_{0.02}$Fe | 215 | 206 | 62.0 |
| Ti$_{0.95}$Zr$_{0.05}$Fe | 206 | 175 | 6.5 |
| Ti$_{0.98}$Zr$_{0.02}$Fe$_{0.92}$ | 228 | 160 | 3.5 |
| Ti$_{0.99}$Hf$_{0.01}$Fe | 211 | 200 | 130.0 |
| Ti$_{0.98}$Hf$_{0.02}$Fe | 209 | 199 | 41.0 |
| Ti$_{0.95}$Hf$_{0.05}$Fe | 204 | 195 | 5.2 |
| Ti$_{0.9}$Hf$_{0.1}$Fe | 197 | 187 | 2.2 |
| Ti$_{0.95}$Hf$_{0.05}$Fe$_{0.9}$ | 220 | 154 | 3.5 |
| Ti$_{0.91}$Hf$_{0.09}$Fe$_{0.85}$ | 248 | 141 | 2.6 |
| Ti$_{0.98}$Zr$_{0.02}$Fe$_{0.98}$Cr$_{0.02}$ | 216 | 199 | 60.0 |
| Ti$_{0.98}$Zr$_{0.02}$Fe$_{0.98}$—V$_{0.02}$ | 210 | 200 | 70.0 |
| Ti$_{0.95}$Zr$_{0.05}$Fe$_{0.95}$—V$_{0.05}$ | 232 | 160 | 4.0 |
| Ti$_{0.98}$Zr$_{0.02}$Fe$_{0.98}$—Cu$_{0.02}$ | 213 | 198 | 75.0 |
| Ti$_{0.98}$Zr$_{0.02}$Fe$_{0.98}$—Mo$_{0.02}$ | 201 | 191 | 80.0 |
| Ti$_{0.98}$Zr$_{0.02}$Fe$_{0.98}$—Co$_{0.02}$ | 208 | 198 | 57.0 |
| Ti$_{0.98}$Zr$_{0.02}$Fe$_{0.98}$—Ni$_{0.02}$ | 205 | 197 | 75.0 |
| Ti$_{0.98}$Zr$_{0.02}$Fe$_{0.98}$—Nb$_{0.02}$ | 213 | 202 | 65.0 |
| Ti$_{0.98}$Zr$_{0.02}$Fe$_{0.98}$—Mn$_{0.02}$ | 214 | 206 | 50.0 |
| Ti$_{0.95}$Hf$_{0.05}$Fe$_{0.95}$—Nb$_{0.05}$ | 225 | 193 | 7.0 |
| Ti$_{0.98}$Hf$_{0.02}$Fe$_{0.95}$—Cr$_{0.03}$ | 210 | 195 | 13.0 |
| Ti$_{0.95}$Zr$_{0.05}$Fe$_{0.95}$—V$_{0.03}$Mn$_{0.02}$ | 221 | 201 | 4.0 |
| Ti$_{0.95}$Hf$_{0.05}$Fe$_{0.85}$—Cr$_{0.05}$ | 201 | 128 | 3.0 |
| Ti$_{0.98}$Hf$_{0.02}$Fe$_{1.15}$—Cr$_{0.02}$ | 181 | 176 | 100.0 |
| Ti$_{0.95}$Zr$_{0.03}$Hf$_{0.02}$—Fe$_{0.95}$Nb$_{0.05}$ | 220 | 187 | 50. |

Note:
*The time required before the initial hydrogenation is complete means a time required before 50 g of an alloy of 5-20 mesh completely occludes hydrogen therein.

From the above results it will be seen that the alloys of the invention are much more readily hydrogenated than Ti-Fe alloy without resorting to the degasifying treatment under heating conditions while keeping the excellent hydrogen storage characteristics of Ti-Fe alloy.

Figure 3:
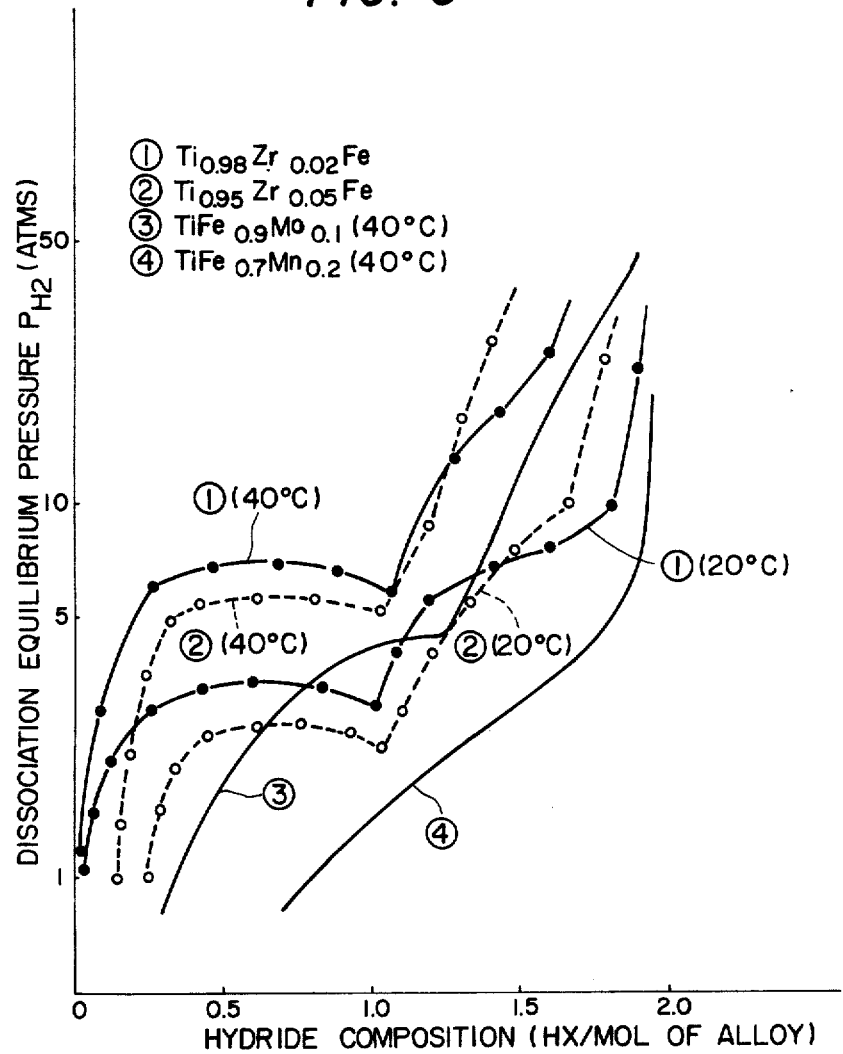
FIG. 3 is a graphical representation of a dissociation equilibrium pressure of hydrogen in relation to variation in hydride composition for different temperatures and different compositions of alloys.
Figure 4:
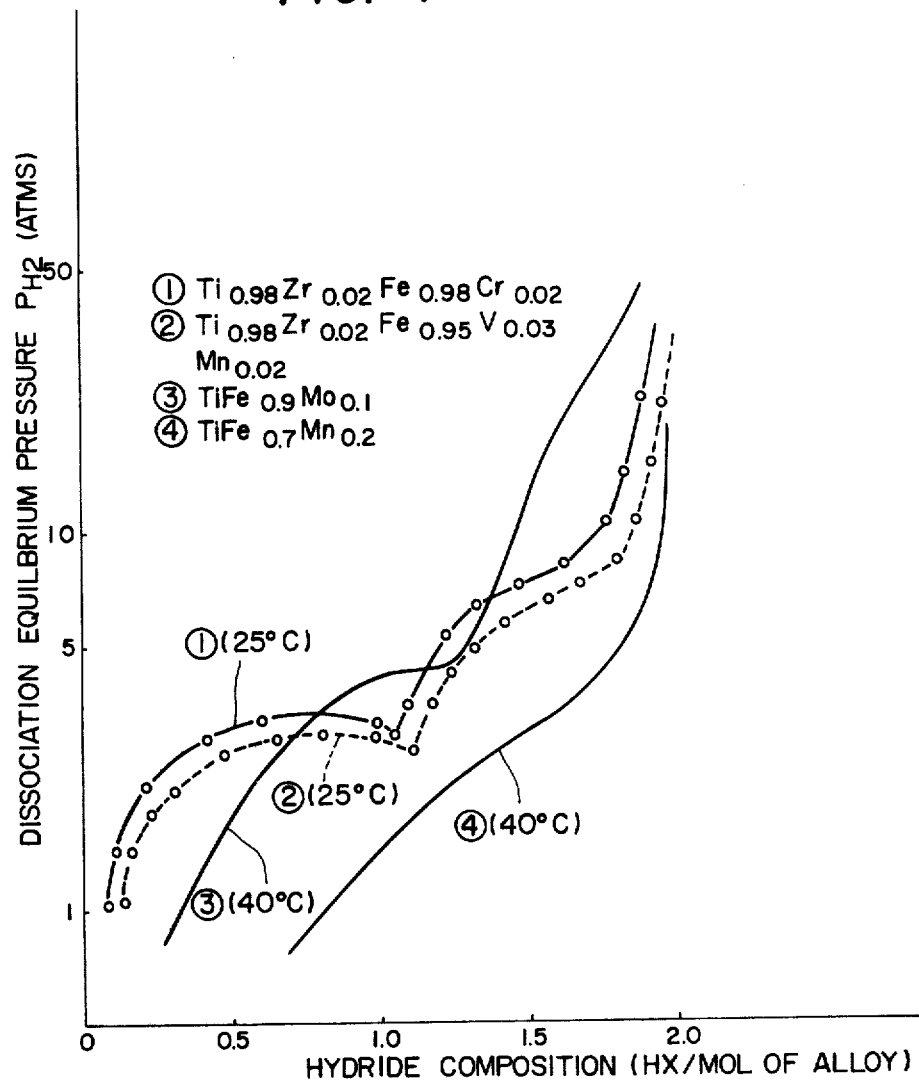
FIG. 4 is a graphical representation similar to FIG. 3.

In FIG. 3, there are shown hydrogen dissociation equilibrium pressure-hydride composition-isotherm curves of (1) $Ti_{0.98}Zr_{0.02}Fe$ and (2) $Ti_{0.95}Zr_{0.05}Fe$ of the invention for temperatures of 20° C. and 40° C. along with known alloys (3) $TiFe_{0.9}Mo_{0.1}$ and (4) $TiFe_{0.7}Mn_{0.2}$ for a temperature of 40° C. In FIG. 4, similar curves of alloys indicated in the figure are shown for a temperature of 25° C.

From both figures, it will be appreciated that the alloys of the invention have more flat plateau pressure ranges than the prior art counterparts and are more excellent in hydrogen storage characteristics.

As will be understood from the foregoing, the alloys have been particularly illustrated as hydrogen storing materials. It will be noted that the alloys of the invention which have absorbed hydrogen therein to form metal hydrides may be used in various manners including catalysts for hydrogenation reactions, a material for hydrogen electrode of cells, and the like since the hydrogen occluded by charging serves as active hydrogen.

What is claimed is:

1. A hydrogen storage alloy of the general formula $$Ti_{1-x}A_xFe_{y-z}B_z$$

wherein A is Hf or a mixture thereof with Zr, B is at least one member selected from the group consisting of Cr, Cu, Co, Mo, V, Ni, Nb, Mn and a mixture thereof, x is a value of from 0.01 to 0.1 when A is Hf, y is a value of from 0.85 to 1.15 when A is Hf, and z is zero or a value of from 0.01 to 0.10 when A is Hf.

2. A hydrogen storage alloy according to claim 1, wherein A is Hf and z is zero.

3. A hydrogen storage alloy according to claim 1, wherein A is a mixture of Zr and Hf and z is zero.

4. A hydrogen storage alloy according to claim 3, wherein x and y vary in proportion to the mixing ratio of Zr and Hf.

5. A hydrogen storage alloy according to claim 1, wherein A is Hf, y is a value of 1 and z is zero.

6. A hydrogen storage alloy according to claim 1, wherein A is a mixture of Hf and Zr, y is a value of 1 and z is zero.

7. A hydrogen storage alloy according to claim 1, wherein A is Hf and z is a value of from 0.01 to 0.10.

8. A hydrogen storage alloy according to claim 1, wherein said alloy is of the formula, $Ti_{1-x}Hf_xFe$ wherein x is a value of from 0.01 to 0.1.

9. A hydrogen storage alloy according to claim 1 wherein said alloy occludes hydrogen to form hydrides thereof.

* * * * *